United States Patent
Takizawa

(10) Patent No.: US 7,542,778 B2
(45) Date of Patent: Jun. 2, 2009

(54) CELLULAR PHONE, PRINT SYSTEM, AND PRINT METHOD THEREFOR

(75) Inventor: Hiroshi Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 668 days.

(21) Appl. No.: 10/844,391

(22) Filed: May 13, 2004

(65) Prior Publication Data

US 2004/0233297 A1 Nov. 25, 2004

(30) Foreign Application Priority Data

May 21, 2003 (JP) .............................. 2003-143575

(51) Int. Cl.
*H04M 1/00* (2006.01)

(52) U.S. Cl. ................. 455/550.1; 455/557; 455/556.1; 455/556.2

(58) Field of Classification Search ................. 455/557, 455/556.1, 556.2, 466, 550.1; 348/222.1, 348/333.05, 333.12, 232
See application file for complete search history.

(56) References Cited

U.S. PATENT DOCUMENTS

| | | | | |
|---|---|---|---|---|
| 4,031,519 | A * | 6/1977 | Findley | 358/1.11 |
| 6,381,513 | B1 * | 4/2002 | Takase et al. | 700/231 |
| 6,424,752 | B1 * | 7/2002 | Katayama et al. | 382/284 |
| 6,883,888 | B2 * | 4/2005 | Kubo | 347/5 |
| 2002/0018138 | A1 | 2/2002 | Yoshiro | |
| 2002/0085771 | A1 * | 7/2002 | Sakuramoto | 382/282 |
| 2002/0154332 | A1 * | 10/2002 | Inai et al. | 358/1.15 |
| 2002/0164995 | A1 * | 11/2002 | Brown et al. | 455/456 |
| 2004/0023686 | A1 * | 2/2004 | King et al. | 455/550.1 |

FOREIGN PATENT DOCUMENTS

| | | |
|---|---|---|
| DE | 196 38 882 A1 | 4/1998 |
| FR | 2 810 184 A | 12/2001 |
| JP | 9-312746 | 12/1997 |
| JP | 2000-125273 A | 4/2000 |
| JP | 2000-307847 A | 11/2000 |
| JP | 2001-257760 A | 9/2001 |
| JP | 2001-326846 A | 11/2001 |
| JP | 2002-108753 A | 4/2002 |
| JP | 2002-351777 A | 12/2002 |

* cited by examiner

*Primary Examiner*—Huy Q Phan
(74) *Attorney, Agent, or Firm*—Foley & Lardner LLP

(57) ABSTRACT

In a cellular phone (201), text data (code data) corresponding to user's input operation is converted into first data format (BMP format or the like) image data. The image data is synthesized with input image data such as a photograph to be allotted in a given format. The image data arranged and synthesized in the format is converted into image data of a second data format (JPEG, GIF, or the like). The converted image data is then printed on a recording sheet (203) in a printer (202).

4 Claims, 6 Drawing Sheets

CELLULAR PHONE, PRINT SYSTEM, AND PRINT METHOD THEREFOR

FIELD OF THE INVENTION

The present invention relates to a technical field of cellular phones and, more particularly to a cellular phone and a print system which allow a printing machine to print code data or a combination of code data and image data of the cellular phone.

BACKGROUND OF THE INVENTION

Conventional cellular phones have various application functions such as a phone book function for storing names and phone numbers, and a schedule function for storing a schedule. In general, data inputted in a cellular phone by a user through utilization of those functions (such data may hereinafter be referred to as "user data") is managed in the form of text data or data that can be converted into-text data in the cellular phone.

Losing or damaging a cellular phone having such application functions means that the user of the cellular phone loses data that has been painstakingly inputted by the user with the help of those application functions.

In anticipation of such events, some users of the cellular phone generally prepare a handwritten copy of the inputted user data in many cases. However, making a handwritten backup copy of all user data is laborious and impractical.

Recent years have provided an alternative to a handwritten backup and now a digital backup of user data in a cellular phone can be made by utilizing software developed for use in personal computers. However, since such software is no use without an access to a PC (personal computer), this is not an option that suites every user. There should be some way to enable a user to take a backup of user data in a cellular phone easily and unfailingly without using a personal computer.

Japanese Patent Laid-open No. 2002-108753 (JP 2002-108753 A) proposes a print system for printing data of an image that is taken by a cellular phone in a place remote from the cellular phone. According to this print system, the image data is sent from the cellular phone by a transmitter (user) to a base station and then to a print service system, where the received image data is printed and the printed image is delivered to the transmitter.

Japanese Patent Laid-open No. 2002-351777 (JP2002-351777 A) proposes a technique that enables one without a printer to obtain a printed copy of data of a desired web site. According to this system, a printed copy of an web site specified by a user is outputted from a printer installed in the nearest convenience store, kiosk, or the like upon a print request sent from a portable terminal.

Accordingly, the technique disclosed in JP 2002-108753 A allows a cellular phone user who does not have an access to a printer to obtain a printed image of image data taken by his/her cellular phone.

The technique disclosed in JP 2002-351777 A allows a portable terminal user who does not have an access to a printer to obtain a printed copy of a desired web site.

However, neither JP 2002-108753 A nor JP 2002-351777 A enables a user of a cellular phone to make a backup of user data (text data) that has been inputted by utilizing various application functions of the cellular phone.

SUMMARY OF THE INVENTION

The present invention has been made in view of the above circumstances pertaining to prior art, and an object of the present invention is therefore to provide a cellular phone, a print system, and a print method therefor which allow a user to input code data in a cellular phone and print the code data in an external printing machine with ease.

To attain the above-mentioned object, a cellular phone according to the present invention includes the following arrangements.

That is, the cellular phone includes:

converting means (110, S2043) for converting code data (for example, text data), which corresponds to an input operation of a user, into first data format (BMP or other format) image data;

arrangement-and-synthesis means (110, S2045) for performing at least one of arrangement processing and synthesis processing on the first data format image data so as to create image data rendered in a given format; and output means (111, S206) for outputting the image data created by the arrangement-and-synthesis means to an external device (202, 204).

In a preferred embodiment of the cellular phone, the arrangement-and-synthesis means includes data format converting means (S205) for converting the first data format image data subjected to at least one of the arrangement processing and the synthesis processing into second data format (JPEG, GIF, other format) image data, which is smaller in data size than the first data format image data, as the image data to be outputted by the output means.

Also, for example, the arrangement-and-synthesis means (110, S203, S204) may perform at least one of arrangement processing and the synthesis processing, on the first data format image data and input image data to render the data in the given format.

Note that the input image data is data created by image pickup means (109) of the cellular phone, for example.

In another preferred embodiment of the cellular phone, the arrangement-and-synthesis means may include arrangement setting means (S2044, 305 to 307) which enables a user to set arrangement of the code data, or the first data format image data (and the input image data) in areas that constitute the given format.

Also for example, the arrangement-and-synthesis means may include selecting means (S2041, 302) which enables a user to select the given format from plural options prepared in advance.

Also for example, the arrangement-and-synthesis means may include editing means (S2041, 301) which enables a user to edit a desired format as the given format.

In the cellular phone according to any one of the embodiments, the code data is data created by an application function (for example, a phonebook function, a memo pad function, a calendar function, and a day planner function) of the cellular phone, for example.

Note that the above-mentioned object is attained by a print system including the cellular phone according to any one of the embodiments and a printing machine connected directly or indirectly through an external device in a communicable manner, and a print method for the print system.

The above-mentioned object is also attained by a program code run on a computer or by a computer-readable storage medium that stores the program code with the cellular phone according to the embodiments of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Preferred embodiments of the present invention will now be described in detail in accordance with the accompanying drawings with the present invention is not limited to those embodiments.

Detailed descriptions will be given on embodiments of the present invention with reference to the accompanying drawings.

Figure 1:
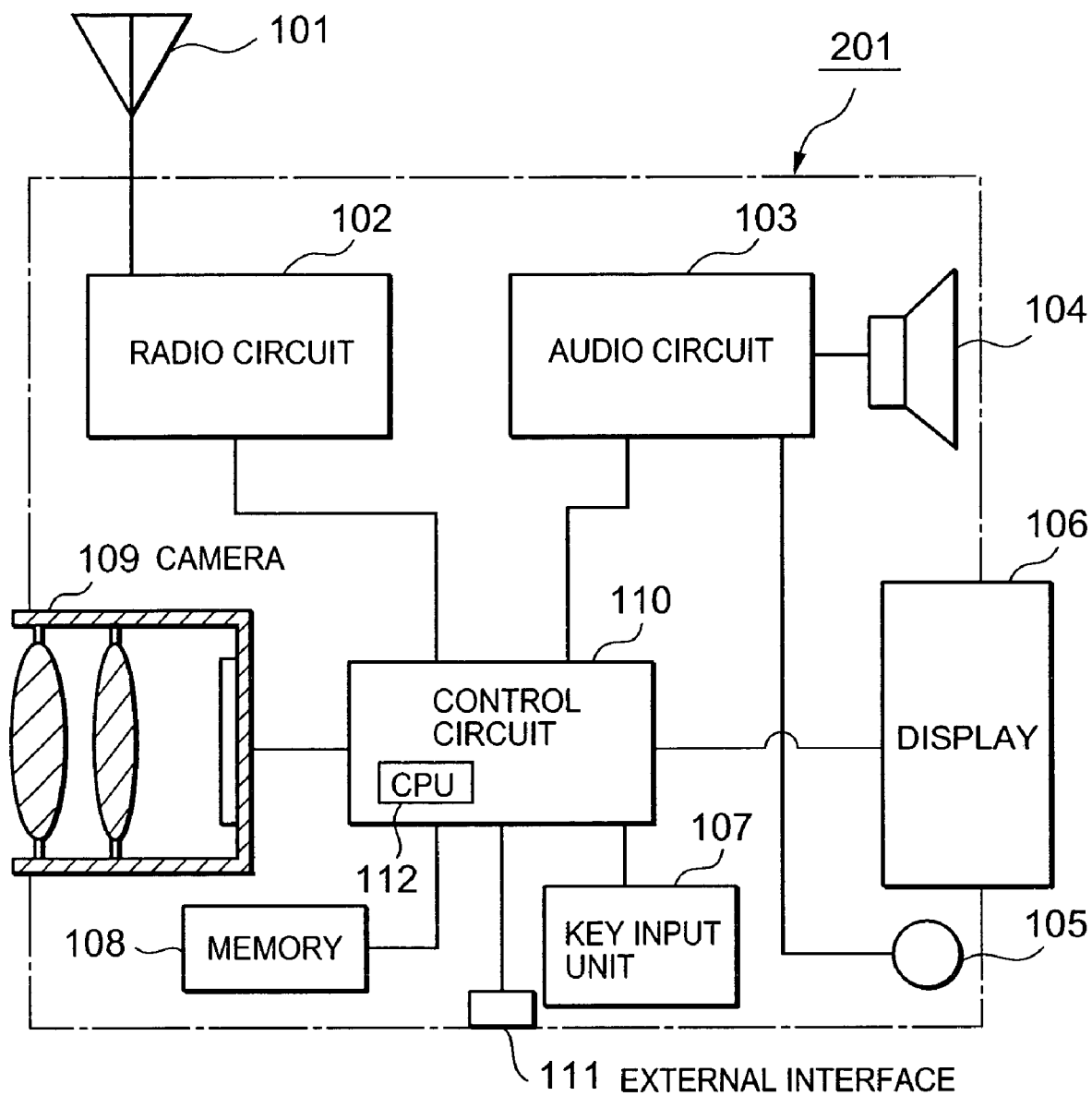
FIG. 1 is a block diagram showing a structure of a cellular phone according to an embodiment of the present invention.
Figure 4:
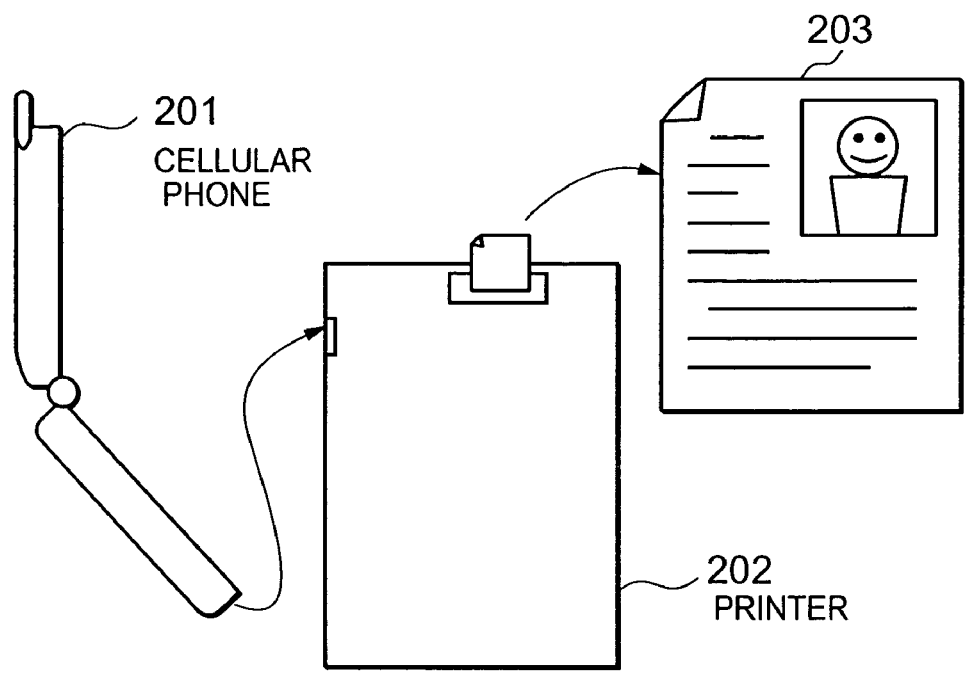
FIG. 4 is a diagram showing how a print service is provided with the use of a print system that includes a cellular phone according to an embodiment of the present invention.

FIG. 4 is a diagram showing how a print service is provided with the use of a print system that includes a cellular phone according to an embodiment of the present invention. FIG. 1 is a block diagram showing the structure of a cellular phone according to an embodiment of the present invention. In this embodiment, a cellular phone 201 shown in FIG. 1 constitutes a part of the print system shown in FIG. 4.

First, operation of the print system according to this embodiment is outlined. The print system of this embodiment uses a printer (may also referred to as printing machine) 202 as a recording device to print image data outputted from the cellular phone 201 (output image data).

The output image data in this embodiment is user data inputted by a user through utilization of various application functions of the cellular phone 201. The user data is code data representing letter strings (including numerals and symbols) and the like. The output image data may also contain input image data such as photographs (details thereof will be described later).

According to this embodiment, a user of the cellular phone 201 obtains a recording sheet 203 on which an image including text, a photo, and others is printed based on the output image data. The major feature of this print system is therefore the cellular phone 201, which can create the output image data.

The device structure and operation of the cellular phone 201 are described with reference to FIGS. 1 through 7.

In the following description, text data is taken as an example of code data that the cellular phone 201 deals with. Here, the term text data refers to common text information represented by ASCII (American Standard Code for Information Interchange), JIS (Japan Industrial Standard), Shift JIS, and the like.

The cellular phone 201 shown in FIG. 1 has an antenna denoted by 101. Reference numeral 102 denotes a radio circuit for transmitting and receiving radio signals. Denoted by 103 is an audio circuit for processing audio signals.

Reference numeral 104 represents a speaker for audio output. 105 indicates a microphone through which sounds are inputted. 106 designates a display (display device) having a liquid crystal display panel or the like to display data, images, and the like.

Denoted by 107 is a key input unit with which a user inputs such data as phone numbers and e-mails or changes various settings. 109 denotes a camera (image pickup apparatus) including a lens, an image pickup device, and others. 108 represents a memory for storing various data.

Stored in the memory 108 of this embodiment are:

data (user data) inputted by a user through utilization of such application functions as a phone book function, a memo pad function, a calendar function, and a schedule management function;

a software program group for operation control of the cellular phone 201 and for the above application functions; and data of an image taken by the camera 109.

Reference numeral 110 indicates a control circuit for controlling every unit in the cellular phone. The control circuit 110 has a CPU (Central Processing Unit) 112 for executing the program group stored in the memory 108, and hardware not shown in the drawing.

The control circuit 110 (CPU 112) in this embodiment manages the user data inputted by the user through utilization of the application functions as text data files or as files having a data format that can be converted into text data.

Then, reference numeral 111 designates an external interface for connecting the cellular phone to an external device (a printer 202, in this embodiment).

The external interface 111 can be an infrared data communication interface such as IrDA (Infrared Data Association), or a short-range wireless communication interface such as Bluetooth.

Alternatively, the external interface 111 may be a connector for connecting a cable to the printer 202. In a system structure that connects the cellular phone 201 directly to the printer 202, a connector compatible with a connector of the printer is employed as the external interface 111.

For operations executed by the cellular phone 201 with the above device structure, such as transmission/reception processing and audio processing, now common techniques can be employed and accordingly this embodiment omits a detailed description of the operations.

Given next is a description of image output processing conducted by the cellular phone 201 that has the above-mentioned device structure.

Figure 2:
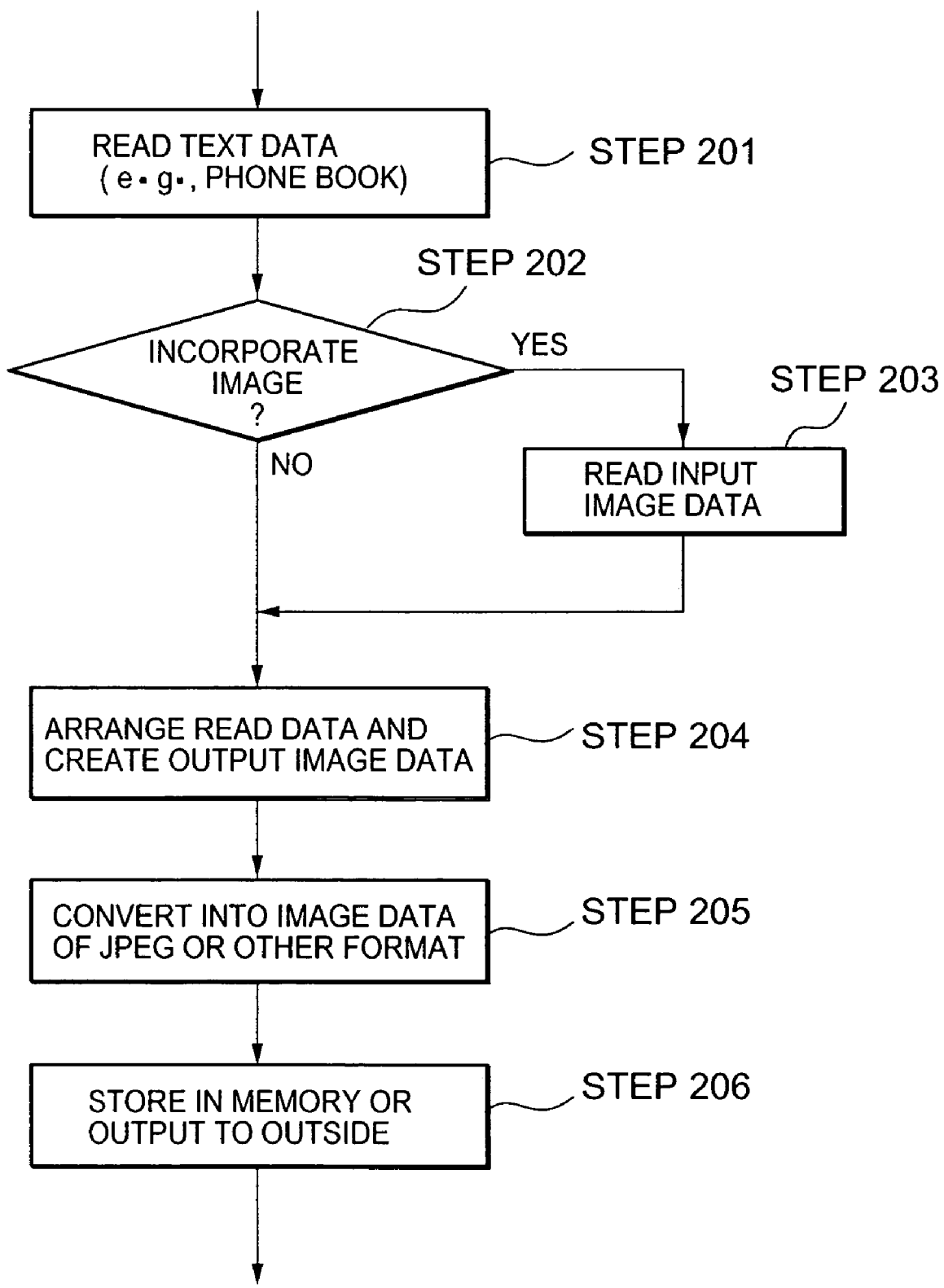
FIG. 2 is a flowchart illustrating image output processing of the cellular phone shown in FIG. 1.

FIG. 2 is a flow chart for image output processing of the cellular phone shown in FIG. 1. The flow chart shows the processing order of a software program implemented by the CPU 112 in the cellular phone 201. The image output processing program is activated as the user operates the key input unit 107 in a certain manner.

In FIG. 2, the CPU 112 of the control circuit 110 first reads text data out of the memory 108 as the image output processing program is activated (Step S201). The text data is, for example, phone book data, phone book listing, memo pad data, calendar data, or day planner data. At this point, the user may add new text data by operating the key input unit 107.

If it is found that the data format of the stored data is not text data while reading the user data out of the memory 108 in Step S201, the CPU 112 converts the user data into text data.

Now common techniques can be employed as techniques for converting user data of data format that is unique to the respective application functions, and accordingly this embodiment omits a detailed description of those techniques.

The CPU 112 of the control circuit 110 then decides whether or not the operation of the key input unit 107 is an instruction to read image data stored in advance in the memory 108 (the data hereinafter will be referred to as "input image data" for convenience's sake of explanation) (Step S202).

The input image data is, for example, image data included in the phone book or the like in the memory 108. In general, phone book data as user data includes names and phone numbers. An advanced phonebook functional lows a user to enter, in addition to names and phone numbers, input image data such as head shots of persons registered in the phone book. If it is the case, the CPU 112 reads the input image data of the pictures out of the memory 108 in Step S202.

The input image data is, for example, image data of landscape photographed by the user with the use of the camera 109. In this case, the input image data is irrelevant to the above text data. The input image data may also be various image data obtained by a user from web sites through utilization of the cellular phone 201.

If the CPU 112 has determined in Step S202 that the input image data is to be included, the input image data specified by the user is read out (Step S203).

Next, the CPU 112 of the control circuit 110 implements processing of Step S204. An outline of Step S204 is given first whereas details of Step S204 will be described later with reference to FIG. 3.

In Step S204, the control circuit 110 arranges and synthesizes text data and input image data selected by the user using a format specified by the user. Output image data is thus obtained. The output image data represents an image in which the text data and the input imaged at a are rendered in the specified format. The format specified by the user is used also when it is determined in Step S202 that input image data is not to be included to create output image data through arrangement and synthesis in Step S204.

Format data to be used in creating output image data may be entered in the memory 108, in advance as a function of the cellular phone 201 or may be entered in the memory 108 in advance by the user. It is also possible for the user to operate the key input unit 107 and create format data when specifying format data.

In a preferred embodiment, some or all of variables including letter layout, font type and size, arrangement of input image, and size of a displayed input image can be specified.

Figure 3:
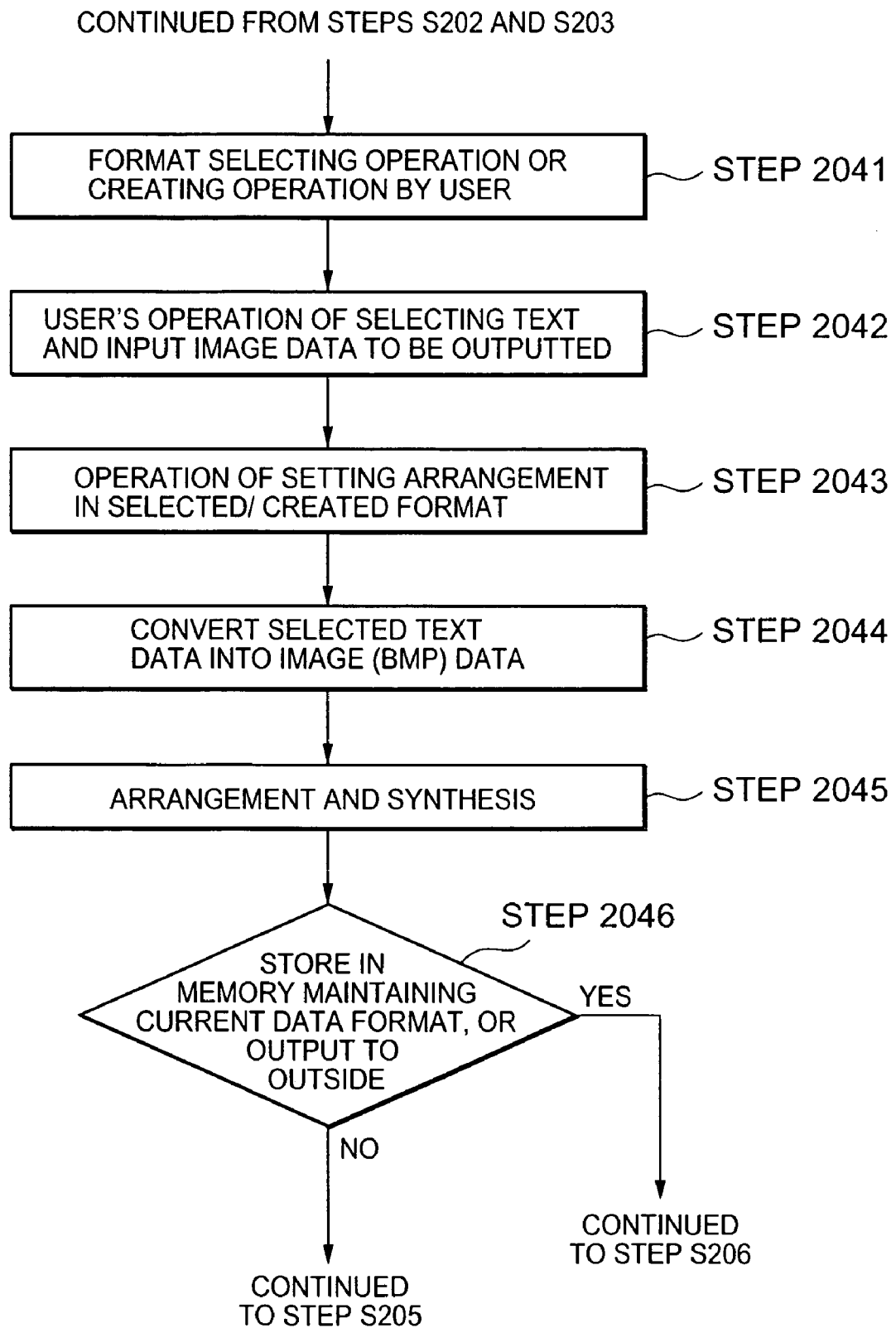
FIG. 3 is a flow chart showing details of Step S204 of the image output processing of FIG. 2.

The description given next is about details of the processing in Step S204. FIG. 3 is a flow chart showing details of Step S204 of the image output processing shown in FIG. 2.

First, the CPU 112 of the control circuit 110 makes a request to the user for an operation of selecting a desired format in which an image (image data) is to be outputted in Step S206, which will be described later, or an operation of creating a desired format by displaying a screen image as the one shown in FIG. 5 by way of example (Step S2041).

Figure 5:
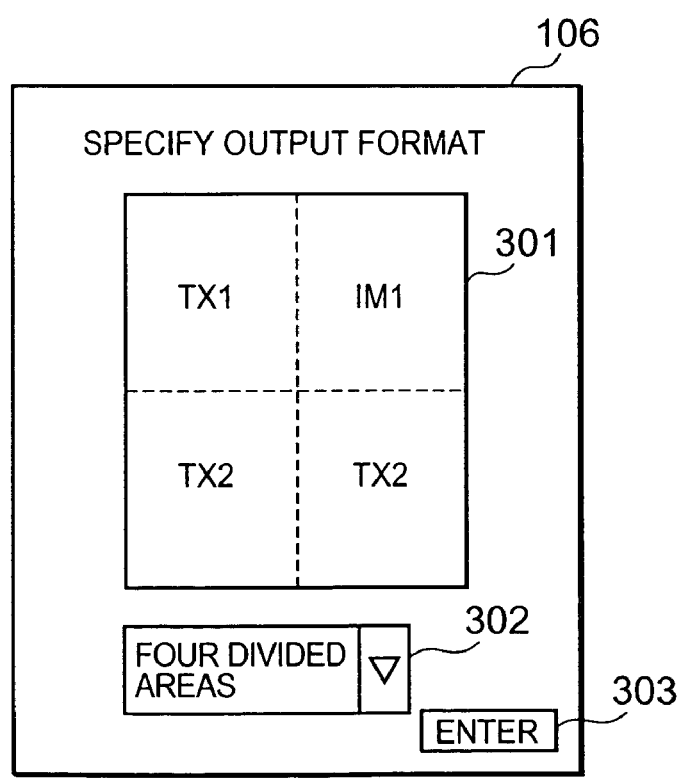
FIG. 5 is a diagram showing an example of a screen image displayed on a display of the cellular phone in Step S2041 (FIG. 3)

FIG. 5 is a diagram showing an example of a screen image displayed on the display 106 of the cellular phone 201 in Step S2041 (FIG. 3). The user utilizes this screen image to specify a desired format.

In FIG. 5, the structure of a format selected or set by the user is displayed in a display operation area 301. A display operation area 302 shows several types of format, enabling the user to select or set from the options. An operation button ("Enter") 303 is a software button for entering in the cellular phone 201 a format specified by the user through utilization of the display operation areas 301 and 302.

A more specific operation example of the thus structured display screen (FIG. 5) is described. The user first chooses a desired format from several options registered in advance by operating the display, operation area 302. The several types of format provided here as options are, for example, formats that are different from one another in number of areas divided, area size after division, or the like.

In the example shown in FIG. 5, the user has chosen a format divided into four areas. The CPU 112 makes the display operation area 301 display the four-division format selected in the display operation area 302.

The user then chooses one from the areas (four areas in this case) that constitute the format shown in the display operation area 301, and proceeds to a definition operation (setting operation) of data to be placed in the selected area. The user repeats a series of the operations for each of the areas.

The definition operation in the example shown in FIG. 5 defines the four areas that constitute the format displayed in the display operation area 301 as follows:

Upper Left Area: TX1, which indicates first text data
Upper Right Area: IM1, which indicates first image data
Lower Left Area: TX2, which indicates second text
Lower Right Area: TX2, which indicates second text In the above definition example, the same text (TX2) is allotted to two areas, the lower left area and the lower right area. The CPU 112 recognizes that the lower left area and the lower right area have the same text (TX2).

Figure 6:
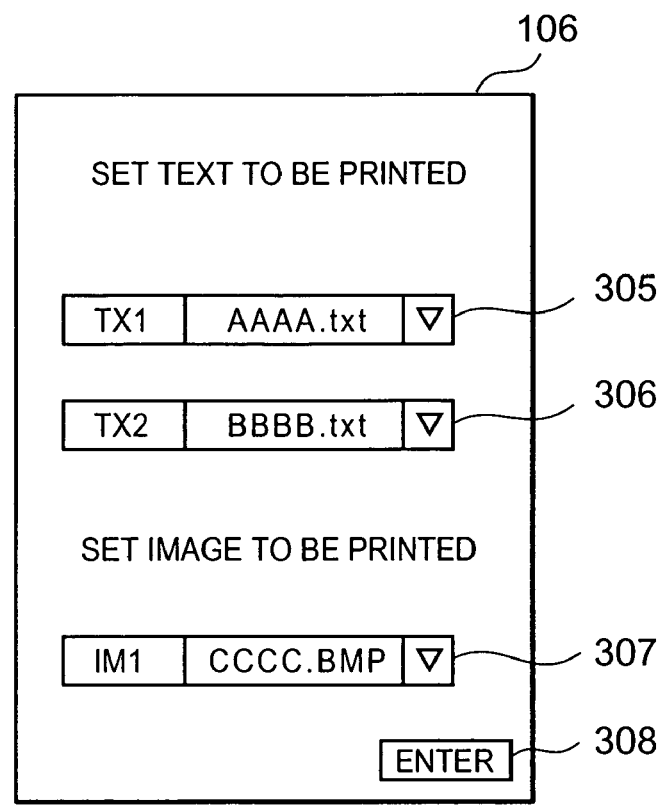
FIG. 6 is a diagram showing an example of a screen image displayed on the display of the cellular phone in Step S2042 and Step S2043 (FIG. 3)

Next, the CPU 112 of the control circuit 110 brings up a screen image shown in FIG. 6 by way of example, to thereby make a request to the user for an operation of selecting text data and input image data to be allotted in the format selected and set in Step S2041 (Step S2042).

The CPU 112 further requests a setting operation for allotting the text data and input image data chosen by the user in Step S2042 to the respective areas of the desired format (Step S2043)

In some cases, data allotted by the selection operations in Step S2042 and Step S2043 may be text data alone or input image data alone depending on the operation of setting a desired format in Step S2041.

FIG. 6 is a diagram showing an example of a screen image displayed on the display 106 of the cellular phone 201 in Step S2042 and S2043. The screen image includes display operation areas 305 through 307, which correspond to the display operation areas provided in the above-described screen image of FIG. 5 for the setting operation by the user.

In FIG. 6, the display operation area 305 is man-machine interface that enables the user to allot certain text data read in Step S201 as the first text data (TX1) for which the area to place has been determined. The display operation area 306 is man-machine interface that enables the user to allot certain text data read in Step S201 as the second text data (TX2) for which the area to place has been determined.

The display operation area 307 is man-machine interface that enables the user to allot certain input image data read in Step S203 as the first input image data (IM1) for which the area to place has been determined.

An operation button ("Enter") 308 is a software button for associating the text data and the input image data, which have been allotted by the user through utilization of the display operation areas 305 through 307, with the respective areas of the format in the cellular phone 201.

In the display screen example shown in FIG. 6, the display operation area 305 shows that text data named "AAAA.txt" is chosen (allotted) as TX1. The display operation area 306 shows that text data named "BBBB.txt" is chosen (allotted) as TX2. The display operation area 307 shows that input image data named "CCCC.bmp" is chosen (allotted) as IM1.

As the user operates the operation button 308, the CPU 112 registers data selected in the display operation areas 305 through 307 as allotment information (association information) for the areas that constitute the format desired by the user.

Next, in Step S2044, the CPU 112 of the control circuit 110 converts each text data for which the area to place in the format has been determined in Step S2043 into bitmap (BMP) format image data as image data of a first data format.

In this embodiment, the text data can be converted into bitmap image data by a now common procedure (for instance, the one disclosed in Japanese Patent Laid-open No. 09-312746 (JP 09-312746 A)). A detailed description of the conversion procedure is therefore omitted in this embodiment.

If user data inputted by the user through utilization of various application functions is a file having a data format that cannot be converted into text data, the user data of this data format may be converted directly into image data of the first data format (BMP format) by a method disclosed in, for example, Japanese Patent Laid-open No. 2000-307847 (JP 2000-307847 A) skipping conversion into text data.

In Step S2045, the CPU 112 performs at least one of arrangement processing and synthesis processing to render in the desired format a text image, which has been obtained by conversion into the first data format (BMP) image data in Step S2044, and the input image data, which has been selected in Step S2042. The text image here is a letter string that constitutes the contents of "AAAA.txt" and "BBBB.txt" in the above example.

Figure 7:
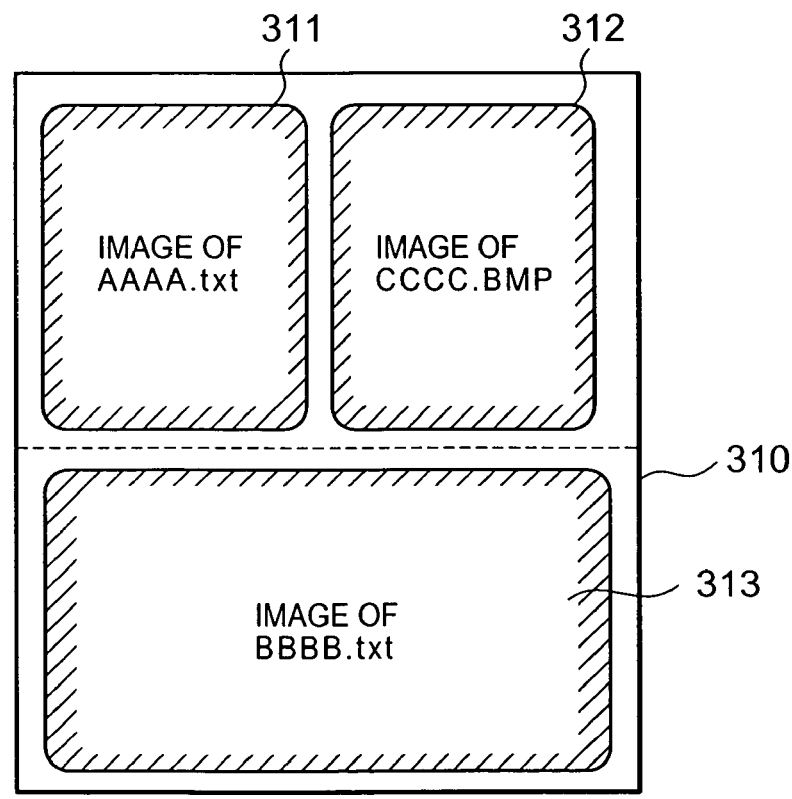
FIG. 7 is a conceptual diagram illustrating output image data which is created through image arrangement and synthesis by the cellular phone in Step S2045 (FIG. 3)

FIG. 7 is a conceptual diagram illustrating output image data which is created through image arrangement and synthesis processing by the cellular phone 201 in Step S2045 (FIG. 3). The conceptual diagram of FIG. 7 corresponds to the display examples shown in FIGS. 5 and 6.

In response to the setting operation and the selection operation by the user in Step S2041 through Step S2043, the CPU 112 creates output image data corresponding to the conceptual diagram of FIG. 7. The data format of the output image data here is the first data format (BMP format).

The letter string indicating the content of "AAAA.txt", which has been chosen as TX1, is placed as image data in an area 311 in FIG. 7. The letter string indicating the content of "BBBB.txt", which has been chosen as TX2, is placed as image data in an area 313. The input image (photograph or the like) indicating the content of "CCCC.bmp", which has been chosen as IM1, is placed as it is in an area 312.

In the above format setting operation in Step S2041 (FIG. 5), the user has placed the second text data (TX2) in two areas. As dictated by the setting operation, the area 313 takes up the lower two areas out of the four areas that constitute the format selected in step S2041.

In Step S2046, the CPU 112 makes a request to the user for an operation of choosing whether or not to output the first data format output image data created in Step S2045 as it is. If outputting the first data format output image data is chosen in Step S2046, the CPU 112 advances the process to Step S206. On the other hand, if the first data format image data is not to be outputted, the CPU 112 advances the process to Step S205.

In Step S205, the CPU 112 of the control circuit 110 converts the output image data (image data of the first data format such as the bitmap format), which has been created in Step S204, into image data of a second data format different from the first data format.

The second data format is, for example, JPEG (Joint Photographic Experts Group), or GIF (Graphic Interchange Format) Image data of the second data format is smaller in data size than image data of the first data format. Therefore, processing for converting into the second data format image data (Step. S205) is suitable for when transmitting data to an external device via communication lines.

The technique for converting bitmap format image data into image data of JPEG, GIF, or like other format is now common and therefore a detailed description of the technique is omitted in this embodiment.

The CPU 112 stores the output image data in the memory 108, or outputs the output image data to the outside through the external interface 111 (Step S206). It is also possible to output the output image data to the outside after storing the output image data in the memory 108. The output image data here is the first data format image data sent from Step S204 or the second data format image data created in Step S205. The output image data is outputted to the outside so that the printer 202 can print the data.

The print system shown in FIG. 4 is composed of the cellular phone 201 and the printer 202 set up in a print service shop (for example, a convenience store or a photo shop) or in user's home.

To print the output image data, the user connects the cellular phone 201 to the printer 202 via a cable or a wireless communication line. Then, as the user operates the cellular phone 201 in a given manner, the control circuit 110 (CPU 112) of the cellular phone 201 transfers the output image data to the printer 202. The printer 202 prints the received output image data onto the recording sheet 203 by a common procedure.

When the printer 202 of the print system shown in FIG. 4 is set in a service shop, the user is charged for printed copies based on the number of printed copies or the like similar to usual print services.

Figure 8:
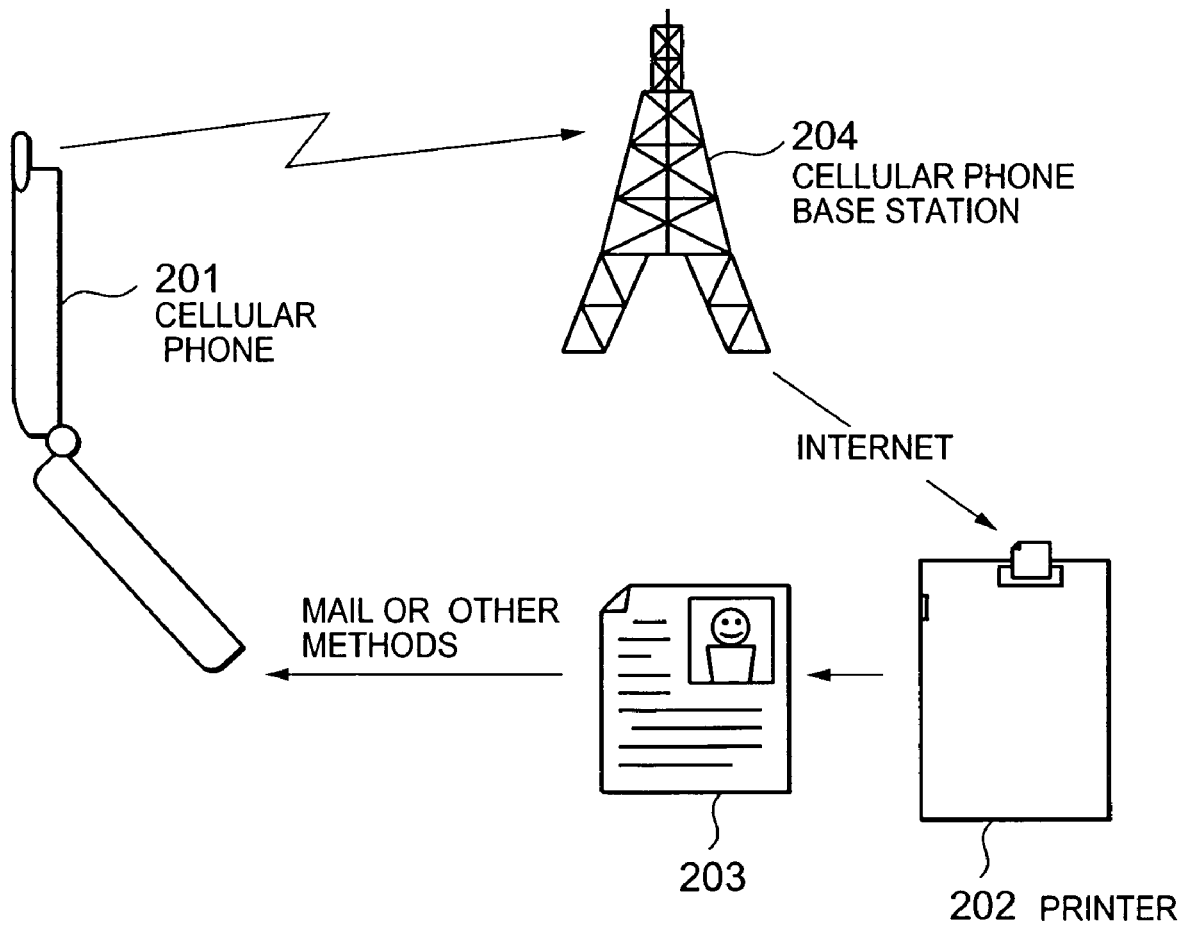
FIG. 8 is a diagram illustrating a case of providing a print service via communication lines in a print system that includes a cellular phone according to another embodiment of the present invention.

FIG. 8 is a diagram illustrating a case of receiving a print service via communication lines in a print system that includes a cellular phone according to another embodiment of the present invention.

In the example of FIG. 8, output image data is transmitted from the cellular phone 201 to the printer 202 in a print service shop via a cellular phone base station 204 and internet which serve as communication lines. An image printed on the recording medium 203 is later sent to the user by mail or the like. The user pays charges for the print service by direct deposit or by other methods.

<Effects of the Embodiment>

According to the embodiments described above, text data specified by the user through an input operation of the cellular phone 201 can readily be printed by the external printing machine 202 after converted into image data. According to the embodiments, the text data and various input image data (for example, image data of a photograph taken by the cellular phone 201) can readily be allotted and printed in a format desired by the user.

Cellular phones with cameras have lately gained popularities and now a few print services designed for photographs that are taken by this type of cellular phones have become available. It is expected that such print services are increased in number and variety as cellular phones mounted with cameras become more popular or as those cameras are improved in performance.

According to the embodiment of the present invention, a business process in such print services and the like can be utilized to print output image data.

The above-described embodiment makes it possible to print text data such as phone book data or memo pad data with ease. The present invention also makes it possible to print on a sheet of paper a combination of image data (for example, image data of landscape) and text data (for example, data of comments on the image data).

Phone book data and like other data smartly laid out in a format desired by a user can be printed with the use of a print service or a home-use printer. The cellular phone 201 of the embodiments is convenient since a printed copy (203) where data is smartly laid out in a desired format can be obtained through a simple editing operation by the user.

Also, according to the embodiments, a user without an access to a personal computer can print user data of various applications including a phone book application on the recording material 203. Furthermore, in printing the user data, a business process such as a common print service can be utilized and therefore a user who does not have an access to a printer can obtain a printed copy without hassle.

Therefore, preparing against loss or damage of a cellular phone is made easy and certain by keeping user data (text data) of various applications in the cellular phone 201 in the form of printed copies. The printed copies function of an effective backup when newly inputting user data.

The descriptions of the above embodiments take as an example a case in which the cellular phone 201 handles text data alone. However, in addition to text data, the present invention is applicable to various code data in which a number (code) unique to each letter, symbol, and the like is allotted so that the data can be processed in an information processing device.

According to the embodiments, code data corresponding to user's input operation in a cellular phone can readily be printed with the use of an external printing machine.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A cellular phone comprising:
   converting means for converting code data, which corresponds to an input operation of a user, into first data format image data, the first data format image data including photographic image data stored in a memory of the cellular phone, the first data format image data further including text data that identifies the photographic image data;
   arrangement-and-synthesis means for performing at least one of arrangement processing and synthesis processing on the first data format image data so as to create image data rendered in a given format; and
   output means for outputting the image data created by said arrangement-and-synthesis means to external device,
   wherein said arrangement-and-synthesis means performs at least one of arrangement processing and the synthesis processing, on the first data format image data and input image data to render the data in the given format, the arrangement processing including dividing up a printing area into a plurality of areas, wherein at least one of the plurality of printing areas is dedicated to printing the photographic image data, and wherein another of the plurality of printing areas is dedicated to printing the text data, and
   wherein said arrangement-and-synthesis means includes arrangement setting means which enables a user to set arrangement of the code data, or the first data format image data in areas that constitute the predetermined format, the arrangement setting means including a first graphical user interface that allows the user to select a number of different regions of a printing area, and a second graphical user interface that allows the user to select in which region of the printing area the photographic image data is to be printed and that allows the user to select in which region of the printing area the text data is to be printed, wherein the user specifies, by way of the second graphical user interface, at least one text file name corresponding to at least one text file that contains the text data and at least one image file name corresponding to at least one image file that contains the photographic image data.

2. The cellular phone according to claim 1, wherein the first graphical user interface allows the user to select each of the different regions as being either a photographic image region or a text data region.

3. A print system comprising a cellular phone and a printing machine which are connected directly or indirectly through an external device in a communicable manner, wherein:
   said cellular phone includes:
      converting means for converting code data, which corresponds to an input operation of a user, into first data format image data, the first data format image data including photographic image data stored in a memory of the cellular phone, the first data format image data further including text data that identifies the photographic image data;
      arrangement-and-synthesis means for performing at least one of arrangement processing and synthesis processing on the first data format image data so as to create image data rendered in a given format; and
      output means for outputting the image data created by the arrangement-and-synthesis means to the outside to transmit the data to the printing machine; and
   said printing machine includes print means for printing on a recording medium the image data received in communication with the cellular phone,
   wherein said arrangement-and-synthesis means performs at least one of arrangement processing and the synthesis processing, on the first data format image data and input image data to render the data in the predetermined format, the arrangement processing including dividing up a printing area into a plurality of areas based on selections made by a user on a first graphical user interface, wherein at least one of the plurality of printing areas is dedicated to printing the photographic image data, and wherein another of the plurality of printing areas is dedicated to printing the text data, and
   wherein the code data is data created by an application function of the cellular phone, the predetermined format including a particular number of divided areas in which to print the text data and the photographic image data, wherein the arrangement-and-synthesis means includes means for allowing the user to select, via the first graphical user interface, the particular number of divided areas from a plurality of different numbers of divided areas, wherein the user specifies, by way of a second graphical user interface, at least one text file name corresponding to at least one text file that contains the text data and at least one image file name corresponding to at least one image file that contains the photographic image data.

4. The print system according to claim 3, wherein the first graphical user interface allows the user to select each of the different regions as being either a photographic image region or a text data region.

* * * * *